United States Patent [19]

Wong et al.

[11] Patent Number: 4,959,225

[45] Date of Patent: Sep. 25, 1990

[54] SYNERGISTIC SWEETENING COMPOSITIONS CONTAINING CHLORODEOXYSUGARS AND MALTITOL AND METHODS FOR PREPARING SAME

[75] Inventors: Lucy L. Wong, Jackson Heights, N.Y.; Steven M. Faust, Stanhope; Subraman R. Cherukuri, Towaco, both of N.J.

[73] Assignee: Warner-Lambert Company, Morris Plains, N.J.

[21] Appl. No.: 264,248

[22] Filed: Oct. 28, 1988

[51] Int. Cl.$^5$ .................. A23L 1/236; A23G 3/30
[52] U.S. Cl. ................................ 426/3; 426/5; 426/658; 426/804
[58] Field of Search ............... 426/316, 658, 546, 804, 426/660

[56] References Cited

U.S. PATENT DOCUMENTS

| Re. 25,959 | 2/1966 | Ranson . | |
|---|---|---|---|
| 2,968,689 | 1/1961 | Kasehagen . | |
| 3,341,609 | 9/1967 | Kasehagen . | |
| 3,356,811 | 12/1967 | Cushing et al. . | |
| 3,396,199 | 8/1968 | Kasehagen . | |
| 3,691,100 | 9/1972 | Wright . | |
| 3,708,396 | 1/1973 | Mitsuhashi et al. . | |
| 3,915,736 | 10/1975 | Oyamada et al. . | |
| 3,918,986 | 11/1975 | Hiraiwa . | |
| 4,158,068 | 6/1979 | Von Rymon Lipinski et al. . | |
| 4,279,931 | 7/1981 | Verwaerde et al. . | |
| 4,495,170 | 1/1985 | Beyts et al. . | |
| 4,536,396 | 8/1985 | Stephens, Jr. et al. . | |
| 4,775,537 | 10/1988 | Calabro et al. | 426/3 |
| 4,780,324 | 10/1988 | Knebl et al. | 426/3 |
| 4,786,491 | 11/1988 | Patel | 426/3 |
| 4,792,453 | 12/1988 | Reed et al. | 426/5 |
| 4,804,543 | 2/1989 | Dokuzovic et al. | 426/3 |
| 4,808,418 | 2/1989 | Tena | 426/5 |

FOREIGN PATENT DOCUMENTS 2154850A  2/1985 United Kingdom .

OTHER PUBLICATIONS

H. A. Lieberman and L. Lachman, *Pharmaceutical Dosage Forms: Tablets Volume 1,* pp. 339 to 469, Marcel Dekker Inc., (1980).
Minifie, B. W., *Chocolate Cocoa and Confectionery: Science and Technology,* pp. 424 to 425, AVI Publishing Company, Inc., (2 ed., 1986).
O'Brien Nabors and Gelardi, *Alternative Sweeteners,* selected sections, Marcel Dekker, Inc., (1986).
*Chemicals Used in Food Processing,* Publication 1274, National Acadmey of Sciences—National Research Council, (1965).

*Primary Examiner*—Jeanette Hunter
*Attorney, Agent, or Firm*—Daniel A. Scola, Jr.; Sandra G. Fields

[57] ABSTRACT

The present invention pertains to a synergistic sweetening composition having a delayed and enhanced sweetness effect which comprises an intense sweetening agent such as a chlorodeoxysugar derivative and a bulking agent comprising at least about 50% maltitol. The synergistic sweetening composition may be used in a wide variety of ingestible products such as hard and soft confections, chewing gum compositions and the like. The present invention also pertains to methods for preparing the synergistic sweetening compositions and the ingestible products in which they may be used.

52 Claims, 4 Drawing Sheets

SYNERGISTIC SWEETENING COMPOSITIONS CONTAINING CHLORODEOXYSUGARS AND MALTITOL AND METHODS FOR PREPARING SAME

BACKGROUND OF THE INVENTION

1. Field of the Invention

This invention relates to sweetness synergy and a delayed and enhanced sweetness effect achieved by combinations of specific intense sweeteners and specific bulking agents. More particularly, this invention relates to a synergistic sweetening effect found between the combination of chlorodeoxysugar derivatives such as 4,1',6'-trichloro-4,1',6'-trideoxygalactosucrose (Sucralose, a commercially available product of McNeil Specialty Products Company of Skillman, N.J.) and bulking agents which comprise at least about 50% maltitol. The synergistic sweetening compositions may be utilized in a wide variety of ingestible compositions. This invention also relates to methods by which these synergistic sweetening compositions may be prepared.

2. Description of the Prior Art

A commonly noted deficiency in ingestible products such as chewing gums, hard and soft confections and the like is the relatively rapid exhaustion of the sweetness sensation during chewing This sweetness loss frequently occurs within the first 3 to 5 minutes of chewing. Accordingly, it is desirable to develop ingestible products which have extended sweetener release.

Intense sweetening agents are natural or synthetic compounds which have a sweetening intensity greater than that of sugar (sucrose) and which oftentimes have a lower caloric value than that of sugar. Because the intense sweeteners provide greater sweetening capacity than sugar, smaller amounts of the sweeteners will provide sweetening intensity equivalent to larger amounts of sugar. Intense sweeteners are well known in the art and are widely used in place of sugar in many low calorie and/or noncariogenic compositions. Intense sweeteners which are not non-caloric, that is, have a caloric value, can provide compositions which have decreased caloric value, as compared to sugar-sweetened compositions, because far lower amounts of the intense sweetener are required to achieve optimum sweetness in the composition.

Intense sweeteners have a wide range of chemically distinct structures and, hence, possess varying properties. These intense sweetener compounds include proteins such as thaumatin (Talin, a commercially available product of Tate & Lyle Products, Reading, United Kingdom), dipeptides such as N-L-alpha-aspartyl-L-phenylalanine 1-methyl ester (Aspartame, a commercially available product of the Nutrasweet Company, Deerfield, Ill.) and dihydrochalcones. Each of these compounds has a distinct sweetening intensity as compared to sucrose and this sweetening intensity is well documented For example, the following compounds have these different sweetening intensities:

| Compound | Intensity (compared to sucrose) |
|---|---|
| Soluble saccharin salts | 300X |
| Cyclamate salts | 30X |
| N—L-alpha-Aspartyl-L-phenylalanine 1-methyl ester (Aspartame) | 180X |
| Potassium salt of 6-methyl- | 200X |

-continued

| Compound | Intensity (compared to sucrose) |
|---|---|
| 1, 2, 3-oxathiazin-4(3H)-one-2, 2-dioxide (Acesulfame-K, a commercially available product of Hoechst Celanese Corporation, Somerville, New Jersey) | |
| 4, 1', 6'-Trichloro-4, 1', 6'-trideoxygalactosucrose (Sucralose, a commercially available product of McNeil Specialty Products Company, Skillman New Jersey) | 600X |
| L-alpha-Aspartyl-N-(2, 2, 4, 4-tetramethyl-3-thietanyl)-D-alaninamide hydrate (alitame, a commercially available product of Pfizer, New York, New York) | 2000X |

Because each intense sweetener is chemically distinct, each sweetener presents a different challenge with respect to the actual use of such sweetener in ingestible compositions. For example, some intense sweeteners present stability problems, such as Aspartame, which exhibits instability in the presence of aldehydes, ketones, moisture and the like. Other intense sweeteners have an associated bitter taste or off-note, such as Saccharin (a commercially available product of PMC Specialty Group Inc., Cinncinnati, Ohio), stevioside, Acesulfame-K , glycyrrhizin, dipotassium glycyrrhizin, glycyrrhizic acid ammonium salt, and thaumatin (Talin).

Certain intense sweeteners have been used to offset the associated bitter aftertaste or unpleasant offnote of other intense sweeteners. For example, United Kingdom patent application No. 2154850A, assigned to Tate & Lyle plc, discloses the use of a combination of at least two intense sweeteners to modify the associated unpleasant taste of one of the sweeteners (cyclamate). The combination of the two sweeteners is said to provide a preferred sweetness. Specifically, a composition is disclosed for sweetening a beverage such as a cola, tea or coffee which comprises combining a chlorosucrose sweetener with a cyclamate, which is either alone or is in combination with other sweeteners.

U.S. Pat. No. 4,495,170, issued to Beytes et al. and assigned to Tate and Lyle plc, discloses synergistic sweetening compositions which comprise a mixture of a chlorodeoxysugar and another sweetening agent which has an associated bitter taste. The chlorodeoxysugars are selected from the group consisting of chlorodeoxysucroses and chlorodeoxygalactosucroses. The bitter tasting sweetening agent is selected from the group consisting of Saccharin, stevioside and Acesulfame-K.

U.S. Pat. No. 4,535,396, issued to Stephens, Jr. et al. and assigned to Pfizer Inc., teaches a method of masking the bitter taste and enhancing the sweet taste of Acesulfame-K by combining the bitter-tasting intense sweetener with the sweetener Alitame.

U.S. Pat. No. 4,158,068, issued to Von Rymon Lipinski et al. and assigned to Hoechst (West Germany), discloses a sweetener mixture to improve the saccharose-like quality of acetosulfame-K. Specifically, acetosulfame-K is combined with at least one intense sweetener selected from the group consisting of aspartyl peptide ester sweeteners, sulfamate sweeteners, sulfimide sweeteners and dihydrochalcone sweeteners.

Thus, a variety of combinations of intense sweeteners are known which have specific sweetness intensities as compared to sucrose. In many ingestible compositions, the use of an intense sweetener also requires the concurrent use of a bulking agent to provide acceptable bulk and texture to the final product. Many and various bulking agents (carriers, diluents, extenders) are known. The particular bulking agent chosen for a specific composition must be sufficient in physical make-up to provide the specific bulk and texture required. The selection of bulking agents is within the capabilities of those of ordinary skill in the art without the need for undue experimentation.

Suitable carbohydrate bulking agents include sugars, sugar alcohols, hydrogenated hexoses, hydrogenated disaccharides, hydrogenated starch hydrolysates and mixtures thereof. Other suitable bulking agents include minerals such as calcium carbonate, talc, titanium dioxide, dicalcium phosphate, celluloses and the like.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof.

Maltitol is disclosed in U.S. Pat. No. 3,708,396 as being a sweet, non-caloric, water-soluble sugar alcohol useful as a bulking agent in the preparation of non-caloric beverages and foodstuffs. Maltitol is made by the hydrogenation of maltose which is the most common reducing disaccharide and is found in starch and other natural products. Starch is prepared from corn, wheat, rice, potatoes, and tapioca among other natural sources by conventional means well known in the art. High maltose containing starch derivatives are usually prepared by the enzymatic action of diastase (usually obtained from malt extract) on starch.

Hydrogenation of maltose may be carried out in the presence of nickel catalysts under basic conditions according to well known procedures such as those disclosed in U.S. Pat. Nos. 2,968,680, 3,396199, 3,341,609 and 3,691,100.

Suitable hydrogenated starch hydrolysates may include those disclosed in U.S. Pat. Nos. Re. 25,959, 3,356,811, 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides The ratios of these different saccharides give different hydrogenated starch hydrolysates different properties Mixtures of hydrogenated starch hydrolysates, such as Lycasin $^R$, a commercially available product manufactured by Roquette Freres of France, and Hystar $^R$, a commercially available product manufactured by Lonza, Inc., of Fairlawn, N.J., are also of interest.

Thus many bulking agents are available for use to prepare products which have acceptable bulk and texture. There is still a need, however, for sweetening compositions which have varying properties and sweetening intensities for use in ingestible compositions. In particular, there is a need for sweetening compositions which have a delayed and enhanced sweetness effect.

Such synergistic sweetening compositions would allow for a reduced total amount of sweetening composition for ingestible compositions, would thereby reduce costs, stability problems, cariogenic properties, and the like. The present invention provides such synergistic sweetening compositions which have a delayed and enhanced sweetness effect and also provides various ingestible sweetening compositions which incorporate such synergistic sweetening compositions.

SUMMARY OF THE INVENTION

The present invention pertains to a synergistic sweetening composition which combines specific intense sweeteners and specific bulking agents in specific proportions to provide a synergy of sweetening intensity. Specifically, the present invention pertains to a synergistic sweetening composition having a delayed and enhanced sweetness effect which comprises an intense sweetening agent such as a chlorodeoxysugar derivative and a bulking agent comprising at least about 50% maltitol. The synergistic sweetening composition may be used in a wide variety of ingestible products such as hard and soft confections, chewing gum compositions and the like. The present invention also pertains to methods for preparing the synergistic sweetening compositions and the ingestible products in which they may be used.

DETAILED DESCRIPTION OF THE INVENTION

The present invention pertains to certain combinations of intense sweetening agents and bulking agents which provide a delayed and enhanced sweetness effect. In particular, the present invention relates to a combination of an intense sweetening agent such as a chlorodeoxysugar derivative and a bulking agent which comprises at least about 50% maltitol. The present invention provides synergistic sweetening compositions which have an improved taste for a prolonged period of time, as well as ingestible products which contain the synergistic sweetening composition.

By the term "ingestible", applicants include all materials and compositions which are used by, or which perform a function in, the body. Thus, materials and compositions which are not adsorbed or absorbed are included as well as digestible and non-digestible materials and compositions.

In a preferred embodiment, the synergistic sweetening compositions of the present invention comprise in percentages by weight: (1) a chlorodeoxysugar derivative present in an amount from about 0.001% to about 5%, and (2) a bulking agent comprising at least about 50% maltitol present in an amount up to about 99.9%. In a more preferred embodiment, the compositions comprise in percentages by weight (1) a chlorodeoxysugar derivative present in an amount from about 0.01% to about 1%, and (2) a bulking agent comprising at least about 50% maltitol present in an amount from about 75% to about 99.9%. In a most preferred embodiment, the compositions comprise in percentages by weight (1) a chlorodeoxysugar derivative present in an amount from about 0.02% to about 0.5%, and (2) a bulking agent comprising at least about 50% maltitol present in an amount from about 90% to about 99%.

The intense sweetening agents (sweeteners) of the present invention are chlorodeoxysugar derivatives. The chlorodeoxysugar derivatives may be derivatives of chlorodeoxysucrose or chlorodeoxygalactosucrose. Examples of chlorodeoxysucrose and chlorodeoxygalactosucrose derivatives include but are not limited to:

(a) 1-chloro-1'-deoxysucrose;
(b) 4-chloro-4-deoxy-alpha-D-galactopyranosylalpha-D-fructofuranoside, or 4-chloro-4-deoxygalactosucrose;
(c) 4-chloro-4-deoxy-alpha-D-galactopyranosyl-1-chloro-1-deoxy-beta-D-fructofuranoside, or 4,1'-dichloro-4,1'-dideoxygalactosucrose;
(d) 1',6'-dichloro-1',6'-dideoxysucrose;
(e) 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose;
(f) 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose;
(g) 6,1',6'-trichloro-6,1',6'-trideoxysucrose;
(h) 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalactosucrose; and
(i) 4,6,1',6'-tetrachloro-4,6,1',6'-tetradeoxysucrose.

In a preferred embodiment, the chlorodeoxysugar derivative is 4-chloro-4-deoxy-alpha-D-galactopyranosyl-1,6-dichloro-1,6-dideoxy-beta-D-fructofuranoside, which is also known as 4,1',6'-trichloro-4,1',6'-trideoxygalactosucrose (Sucralose).

The intense sweetening agents of the present invention may be used in many distinct physical forms well known in the art to provide an initial burst of sweetness and flavor and/or a prolonged sensation of sweetness and flavor. Without being limited thereto, such physical forms include free forms, such as spray dried, powdered, and beaded forms, and encapsulated forms, and mixtures thereof.

The amount of chlorodeoxysugar derivative employed in an ingestible composition is normally a matter of preference, subject to such factors as the individual chlorodeoxysugar derivative sweetener used, the type of bulking agent or carrier employed, and the strength of sweetness and flavor desired. Thus, the amount of sweetener may be varied in order to obtain the result desired in the final product and such variations are within the capabilities of those skilled in the art without the need for undue experimentation.

The bulking agents of the present invention are comprised of at least about 50% maltitol, by weight of the bulking agent, preferably from about 75% to about 100% maltitol, and more preferably from about 90% to about 100% maltitol, by weight of the bulking agent.

In addition to maltitol, the bulking agents of the present invention may also be comprised of additional carbohydrate bulking agents. The additional bulking agents must be sufficient in physical make-up to provide adequate bulk and texture to the composition. Suitable additional carbohydrate bulking agents include sugars, sugar alcohols, hydrogenated hexoses, hydrogenated disaccharides, hydrogenated starch hydrolysates and mixtures thereof. Other suitable additional bulking agents include minerals such as calcium carbonate, talc, titanium dioxide, dicalcium phosphate, and the like. The carbohydrate bulking agents discussed above as being suitable for use in ingestible compositions concurrently with intense sweeteners may also be used as the additional carbohydrate bulking agents.

The synergistic sweetening compositions of the present invention are prepared by admixing the chlorodeoxysugar derivative into the bulking agent which comprises at least about 50% maltitol.

The combination of the intense sweeteners and bulking agents set out above, in the proportions disclosed, results in a synergistic sweetening composition having a delayed and enhanced sweetness effect. The sweetening intensity and the delayed sweetening effect of the present composition are markedly greater than that expected by mere combination of the intense sweetener and bulking agent ingredients. Accordingly, applicants' synergistic sweetening compositions have the advantage of providing an improved taste over a prolonged period of time as well as requiring lower amounts of sweetener to adequately sweeten an ingestible composition with no effect on the sweetness of the composition.

Once prepared, the inventive synergistic sweetening composition may be stored for future use or may be formulated with conventional additives, such as pharmaceutically acceptable carriers or confectionery ingredients to prepare a wide variety of ingestible compositions, such as foodstuffs, beverages, jellies, extracts, confectionery products, pharmaceutical compositions administered orally, and hygienic products such as toothpastes, dental lotions, chewing gums or mouth washes.

The present invention extends to methods of making the ingestible compositions. In such a method, a composition is made by admixing the synergistic sweetening composition of the present invention with the other ingredients of the final desired composition. Other ingredients will usually be incorporated into the composition as dictated by the nature of the desired composition as well known by those having ordinary skill in the art. The ultimate ingestible compositions are readily prepared using methods generally known in the food technology and pharmaceutical arts.

An important aspect of the present invention includes a chewing gum composition incorporating the inventive synergistic sweetening composition and a method for preparing the chewing gum composition, including both chewing gum and bubble gum formulations. With regard to a chewing gum composition, such compositions contain a gum base, the inventive synergistic sweetening composition, and various additives.

The gum base employed will vary greatly depending upon various factors such as the type of base desired, the consistency of gum desired and the other components used in the composition to make the final chewing gum product. The gum base may be any water-insoluble gum base known in the art, and includes those gum bases utilized for chewing gums and bubble gums. Illustrative examples of suitable polymers in gum bases include both natural and synthetic elastomers and rubbers. For example, those polymers which are suitable as gum bases include, without limitation, substances of vegetable origin such as chicle, crown gum, nispero, rosidinha, jelutong, perillo, niger gutta, tunu, balata, gutta-percha, lechi-capsi, sorva, gutta kay, mixtures thereof and the like. Synthetic elastomers such as butadiene-styrene copolymers, polyisobutylene, isobutyleneisoprene copolymers, polyethylene, mixtures thereof and the like are particularly useful.

The gum base may include a non-toxic vinyl polymer, such as polyvinyl acetate and its partial hydrolysate, polyvinyl alcohol, and mixtures thereof. When utilized, the molecular weight of the vinyl polymer may range from about 3,000 up to and including about 94,000.

The amount of gum base employed will vary greatly depending upon various factors such as the type of base used, the consistency of the gum desired and the other components used in the composition to make the final chewing gum product. In general, the gum base will be present in amounts from about 5% to about 94%, by weight of the final chewing gum composition, and preferably in amounts from about 15% to about 45%, and more preferably in amounts from about 15% to about 35%, and most preferably in amounts from about 20% to about 30%, by weight of the final chewing gum composition.

The gum base composition may contain conventional elastomer solvents to aid in softening the elastomer base component. Such elastomer solvents may comprise terpinene resins such as polymers of alpha-pinene or beta-pinene, methyl, glycerol or pentaerythritol esters of rosins or modified rosins and gums, such as hydrogenated, dimerized or polymerized rosins or mixtures thereof. Examples of elastomer solvents suitable for use herein include the pentaerythritol ester of partially hydrogenated wood or gum rosin, the pentaerythritol ester of wood or gum rosin, the glycerol ester of wood rosin, the glycerol ester of partially dimerized wood or gum rosin, the glycerol ester of polymerized wood or gum rosin, the glycerol ester of tall oil rosin, the glycerol ester of wood or gum rosin and the partially hydrogenated wood or a gum rosin and the partially hydrogenated methyl ester of wood or rosin, mixtures thereof, and the like. The elastomer solvent may be employed in amounts from about 5.0% to about 75.0%, by weight of the gum base, and preferably from about 45.0% to about 70.0%, by weight of the gum base.

A variety of traditional ingredients may be included in the gum base in effective amounts such as plasticizers or softeners such as lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, mixtures thereof, and the like may also be incorporated into the gum base to obtain a variety of desirable textures and consistency properties. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like may also be incorporated into the gum base to obtain a variety of desirable textures and consistency properties. These traditional additional materials are generally employed in amounts up to about 30.0%, by weight of the gum base, and preferably in amounts from about 3% to about 20%, by weight of the gum base.

The gum base may include effective amounts of mineral adjuvants such as calcium carbonate, magnesium carbonate, alumina, aluminum hydroxide, aluminum silicate, talc, tricalcium phosphate, dicalcium phosphate and the like as well as mixtures thereof. These mineral adjuvants may serve as fillers and textural agents. These fillers or adjuvants may be used in the gum base in various amounts. Preferably the amount of filler when used will be present in an amount from greater than about 0% to about 60%, by weight of the chewing gum base.

The chewing gum base may additionally include the conventional additives of coloring agents, antioxidants, preservatives and the like. For example, titanium dioxide and other dyes suitable for food, drug and cosmetic applications, known as F.D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the chewing gum base.

The gum composition may include effective amounts of conventional additives selected from the group consisting of sweetening agents (sweeteners), plasticizers, softeners, emulsifiers, waxes, fillers, bulking agents, mineral adjuvants, flavoring agents (flavors, flavorings), coloring agents (colorants or colorings), antioxidants, acidulants, thickeners, mixtures thereof and the like. Some of these additives may serve more than one purpose. For example, in sugarless gum compositions, the sweetener, e.g., sorbitol or other sugar alcohol or mixtures thereof, may also function as a bulking agent. Similarly, in sugar containing gum compositions, the sugar sweetener can also function as a bulking agent.

The plasticizers, softeners, mineral adjuvants, colorants, waxes and antioxidants discussed above as being suitable for use in the gum base may also be used in the gum composition. Examples of other conventional additives which may be used include emulsifiers, such as lecithin and glyceryl monostearate, thickeners, used alone or in combination with other softeners, such as methyl cellulose, alginates, carrrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants. The fillers when used may be utilized in an amount from greater than about 0% to about 60%, by weight of the gum composition.

Bulking agents (carriers, extenders) suitable for use include sweetening agents selected from the group consisting of monosaccharides, disaccharides, polysaccharides, sugar alcohols, and mixtures thereof; polydextrose; maltodextrins; minerals, such as calcium carbonate, talc, titanium dioxide, dicalcium phosphate, and the like. Bulking agents may be used in amounts up to about 90%, by weight of the final gum composition, with amounts from about 15% to about 70%, by weight of the gum composition being preferred, with from about 50% to about 65%, by weight, being more preferred and from about 55% to about 60%, by weight of the chewing gum composition, being most preferred.

The sweetening agent used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as monosaccharides, disaccharides and polysaccharides such as xylose, ribulose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalocones, monellin, steviosides, glycyrrhizin, and sugar alcohols such as sorbitol, mannitol, maltitol, hydrogenated starch hydrolysates and mixtures thereof;

(b) watersoluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and the like;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine; L-aspartyl-L-(1-cyclohexen)-alanine, and the like;

(d) water-soluble sweeteners derived from naturally occurring water-soluble sweeteners, such as chlorinated derivatives of ordinary sugar (sucrose), known, for example, under the product designation of Sucralose; and (e) protein based sweeteners such as thaumaoccous danielli (Thaumatin I and II).

In general, an effective amount of sweetener is utilized to provide the level of bulk and/or sweetness desired, and this amount will vary with the sweetener selected. This amount of sweetener will normally be present in amounts from about 0.0010% to about 90%, by weight of the gum composition, depending upon the sweetener used. The exact range of amounts for each type of sweetener is well known in the art and is not the subject of the present invention. The amount of sweetener ordinarily necessary to achieve the desired level of sweetness is independent from the flavor level achieved from flavor oils.

Preferred sugar-based sweeteners are sugar (sucrose), corn syrup and mixtures thereof. Preferred sugarless sweeteners are the sugar alcohols, artificial sweeteners, dipeptide based sweeteners and mixtures thereof. Preferably, sugar alcohols are used in the sugarless compositions because these sweeteners can be used in amounts which are sufficient to provide bulk as well as the desired level of sweetness. Preferred sugar alcohols are selected from the group consisting of sorbitol, xylitol, maltitol, mannitol, and mixtures thereof. More, preferably sorbitol or a mixture of sorbitol and mannitol is utilized. The gamma form of sorbitol is preferred. An artificial sweetener or dipeptide based sweetener is preferably added to the gum compositions which contain sugar alcohols.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillan (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent employed herein is normally a matter of preference subject to such factors as the type of final ingestible compositions, the individual flavor, the gum base employed, and the strength of flavor desired. Thus, the amount of flavoring may be varied in order to obtain the result desired in the final product and such variations are within the capabilities of those skilled in the art without the need for undue experimentation. In gum composition applications, the flavoring agent is generally present in amounts from about 0.02% to about 5%, by weight of the gum composition. Preferably, the flavoring agent is present in amounts from about 0.1% to about 2%, and more preferably, the flavoring agent is present in amounts from about 0.8% to about 1.8%, by weight of the gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenyl-methane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7.0%, by weight, and preferably up to about 3.5%, by weight of the gum composition.

In accordance with this invention, effective amounts of the synergistic sweetening compositions of the invention may be admixed into the chewing gum composition. The amount of synergistic sweetening composition employed is normally a matter of preference subject to such factors as the particular type of gum composition being prepared, the individual intense sweetening agent used, the type of bulking agent or carrier employed, the type of flavor employed and the intensity of sweetness desired. Thus, the amount of synergistic sweetening composition may be varied in order to obtain the result desired in the final product and such variations are within the capabilities of those skilled in the art without the need for undue experimentation.

In a preferred embodiment, the synergistic sweetening compositions of the present invention comprise in percentages by weight: (1) a chlorodeoxysugar derivative present in an amount from about 0.001% to about 5%, and (2) a bulking agent comprising at least about 50% maltitol present in an amount up to about 99.9%. In a more preferred embodiment, the compositions comprise in percentages by weight (1) a chlorodeoxysugar derivative present in an amount from about 0.02% to about 1%, and (2) a bulking agent comprising at least about 50% maltitol present in an amount from about 75% to about 99.9%. In a most preferred embodiment, the compositions comprise in percentages by weight (1) a chlorodeoxysugar derivative present in an amount from about 0.05% to about 0.5%, and (2) a bulking agent comprising at least about 50% maltitol present in an amount from about 90% to about 99%.

In a preferred embodiment, the synergistic sweetening composition of the present invention is present in the chewing gum composition in amounts from about from 5% to about 90%, by weight of the chewing gum composition. In a more preferred embodiment, the synergistic sweetening composition of the present invention is present in the chewing gum composition in amounts from about from 20% to about 75%, by weight of the chewing gum composition. In a most preferred embodiment, the synergistic sweetening composition of the present invention is present in the chewing gum composition in amounts from about from 45% to about 65%, by weight of the chewing gum composition.

The synergistic sweetening compositions may be incorporated into an otherwise conventional chewing gum composition using standard techniques and equipment known to those skilled in the art. For example, a gum base is heated to a temperature sufficiently high enough to soften the base without adversely effecting the physical and chemical make up of the base. The optimum temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the base such as the plasticizer, fillers, the bulking agent and/or sweeteners, the softener and coloring agents to plasticize the blend as well as to modulate the hardness, viscoelasticity and formability of the base. The chewing gum base is then blended with the flavoring agents and the inventive synergistic sweetening composition which may have been previously blended with other traditional ingredients. Mixing is continued until a uniform mixture of gum composition is obtained. Thereafter the gum composition mixture may be formed into desirable chewing gum shapes.

The preparation of confectionery formulations is historically well known and has changed little through the years. Confectionery items have been classified as either "hard" confectionery or "soft" confectionery. The synergistic sweetening compositions of the present invention can be incorporated by admixing the inventive composition into conventional hard and soft confections.

Hard confectionery may be processed and formulated by conventional means. In general, a hard confectionery has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% corn syrup, up to about 55% sugar and from about 0.1% to about 5% water, by weight of the final composition. The syrup component is generally prepared from corn syrups high in fructose, but may include other materials. Further ingredients such as flavorings, sweeteners, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145 to 156° C. is achieved. The batch is then cooled and worked as a plastic-like mass to incorporate additives such as flavors, colorants and the like.

A high-speed atmospheric cooker uses a heat-exchanger surface which involves spreading a film of candy on a heat exchange surface, the candy is heated to 165° to 170° C. in a few minutes. The candy is then rapidly cooled to 100° to 120° C. and worked as a plastic-like mass enabling incorporation of the additives, such as flavors, colorants and the like.

In vacuum cookers, the carbohydrate bulking agent is boiled to 125 to 132° C., vacuum is applied and additional water is boiled off without extra heating. When cooking is complete, the mass is a semi-solid and has a plastic-like consistency. At this point, flavors, colorants, and other additives are admixed in the mass by routine mechanical mixing operations.

The optimum mixing required to uniformly mix the flavors, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H.A. Lieberman, *Pharmaceutical Dosage Forms: Tablets*, Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavors, colorants and so forth.

Similar to hard confectionery, soft confectionery may be utilized in this invention. The preparation of soft confections, such as nougat, involves conventional methods, such as the combination of two primary components, namely (1) a high boiling syrup such as a corn syrup, hydrogenated starch hydrolysate or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent such as a hydrogenated starch hydrolysate. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, *Chocolate, Cocoa and Confectionery: Science and Technology*, 2nd edition, AVI Publishing Co., Inc., Westport, Conn. (1980), at pages 424–425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

In accordance with this invention, effective amounts of the synergistic sweetening compositions of the present invention may be admixed into the hard and soft confections. The amount of synergistic sweetening composition may be varied in order to obtain the result desired in the final product and such variations are within the capabilities of those skilled in the art without the need for undue experimentation. A sweetened confectionery product in the present invention may comprise a confectionery bulking agent in amounts up to about 99%, by weight of the sweetened confectionery product.

The synergistic sweetening compositions may be incorporated into an otherwise conventional hard or soft confection composition using standard techniques and equipment known to those skilled in the art.

The synergistic sweetening compositions may be formulated with conventional ingredients which offer a variety of textures to suit particular applications. Such ingredients may be in the form of hard and soft confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such confections and chewing gum products is well known.

The present invention is further illustrated by the following examples which are not intended to limit the effective scope of the claims. All parts and percentages in the examples and throughout the specification and claims are by weight of the final composition unless otherwise specified.

EXAMPLES 1-3

The examples demonstrate the sweetness intensity contribution versus time found for various intense sweeteners in chewing gum products containing maltitol as the bulking agent.

| Ingredient (Percent by Weight) | EXAMPLES | | |
|---|---|---|---|
| | 1 | 2 | 3 |
| gum base | 23.0 | 23.0 | 23.0 |
| softener | 15.5 | 15.5 | 15.5 |
| colorant | 0.2 | 0.2 | 0.2 |
| flavor | 1.3 | 1.3 | 1.3 |
| mannitol | 7.0 | 7.0 | 7.0 |
| maltitol | 52.86 | 52.75 | 52.9475 |
| Saccharin | 0.1400 | — | — |
| Acesulfame-K | — | 0.2500 | — |
| Sucralose | — | — | 0.0525 |

Figure 1:
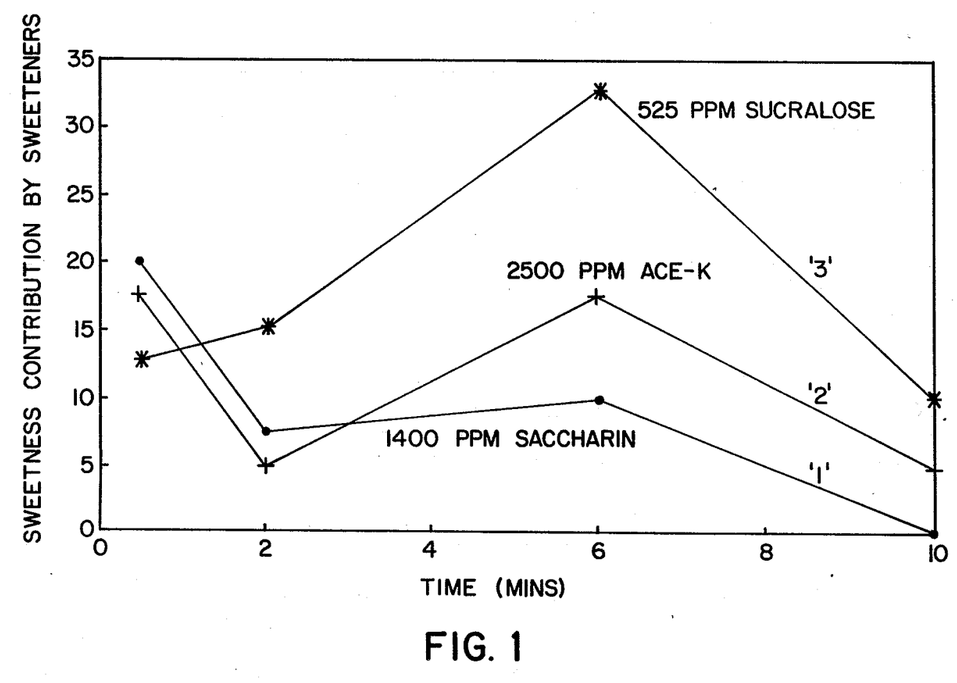
FIG. 1 depicts in graph format the sweetness intensity contribution versus time found for various intense sweeteners in chewing gum products containing maltitol as the bulking agent (Examples 1-3).

A five person expert sensory chew panel evaluated the chewing gum product of examples 1-3. The net sweetness intensity contribution of the individual intense sweetening agents in the chewing gum product containing maltitol as the bulking agent is illustrated in FIG. 1. The net sweetness intensity of the intense sweetener was obtained by calculating the sensory difference between the sweetening intensity of chewing gum containing the intense sweetener and the sweetening intensity of chewing gum containing no intense sweetener.

The chewing gum product of example 3, which contained Sucralose as the intense sweetening agent, was significantly sweeter than the chewing gum products of examples 1 and 2, which contained Saccharin and Acesulfame-K, respectively, as the intense sweeteners. Moreover, the chewing gum product of example 3 had greater sweetness intensity after 2, 6, and 10 minutes than the chewing gum products of examples 1 and 2.

EXAMPLES 4-13

These examples demonstrate the sweetness intensity contribution versus time found for the intense sweetener Sucralose in chewing gum products containing as the bulking agent sorbitol and maltitol in various proportions.

EXAMPLES 4-13

| Ingredient (Percent by Weight) | EXAMPLES | | | | | | | | | |
|---|---|---|---|---|---|---|---|---|---|---|
| | 4 | 5 | 6 | 7 | 8 | 9 | 10 | 11 | 12 | 13 |
| | A | | B | | C | | D | | E | |
| gum base | 23.0 | 23.0 | 23.0 | 23.0 | 23.0 | 23.0 | 23.0 | 23.0 | 23.0 | 23.0 |
| softener | 15.5 | 15.5 | 15.5 | 15.5 | 15.5 | 15.5 | 15.5 | 15.5 | 15.5 | 15.5 |
| colorant | 0.2 | 0.2 | 0.2 | 0.2 | 0.2 | 0.2 | 0.2 | 0.2 | 0.2 | 0.2 |
| flavor | 1.3 | 1.3 | 1.3 | 1.3 | 1.3 | 1.3 | 1.3 | 1.3 | 1.3 | 1.3 |
| sorbitol | 53.0 | 52.95 | 39.7 | 39.65 | 26.5 | 26.45 | 13.3 | 13.2 | — | — |
| maltitol | — | — | 13.3 | 13.3 | 26.5 | 26.5 | 39.7 | 39.75 | 53.0 | 52.95 |
| mannitol | 7.0 | 7.0 | 7.0 | 7.0 | 7.0 | 7.0 | 7.0 | 7.0 | 7.0 | 7.0 |
| Sucralose | — | 0.05 | — | 0.05 | — | 0.05 | — | 0.05 | — | 0.05 |

Figure 4:
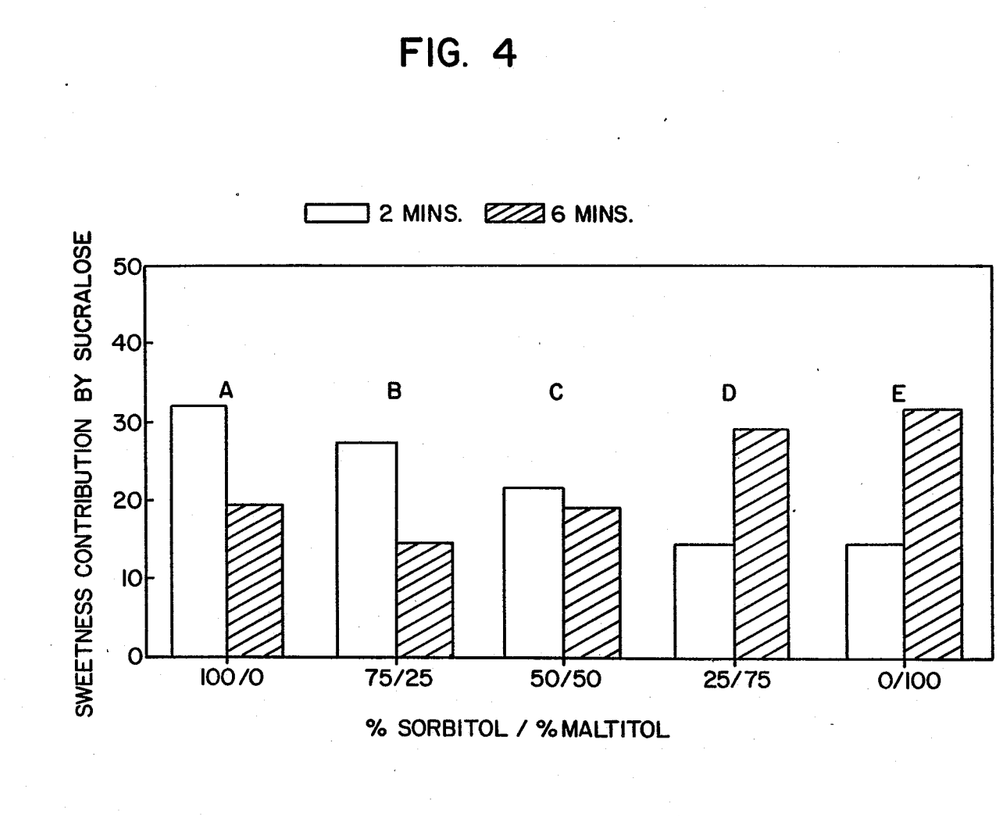
FIG. 4 depicts in bar graph format the sweetness intensity contribution versus time found for the intense sweetener Sucralose in chewing gum products containing as the bulking agent sorbitol and maltitol in various proportions (Examples 4-13).

A five person expert sensory chew panel evaluated the chewing gum products of examples 4-13. The net sweetness intensity contribution of the intense sweetening agent Sucralose in the gum products containing as the bulking agent sorbitol and maltitol in various proportions is illustrated in FIG. 4. The net sweetness intensity of the intense sweetener was obtained by calculating the sensory difference between the sweetening intensity of chewing gum containing the intense sweetener and the sweetening intensity of chewing gum containing no intense sweetener. For example, the net sweetness intensity of sucralose without sorbitol as the bulking agent may be obtained by calculating the sensory difference between the sweetening intensity of the chewing gum product of example 5 (sorbitol plus Sucralose) minus the sweetening intensity of the chewing gum product of example 4 (sorbitol only) (example 5-example 4).

The chewing gum products of examples 9, 11 and 13, which contained as the bulking agent at least 50% maltitol (composition pairs C, D and E) were significantly sweeter, especially at 6 minutes, than the chewing gum products of examples 5 and 7 (composition pairs A and B) which contained as the bulking agent, 0% maltitol and 25% maltitol, respectively. The chewing gum products of examples 5 and 7 were found to have an initial sweetness at 2 minutes that was greater than the initial sweetness of the chewing gum products of examples 9, 11 and 13.

Figure 2:
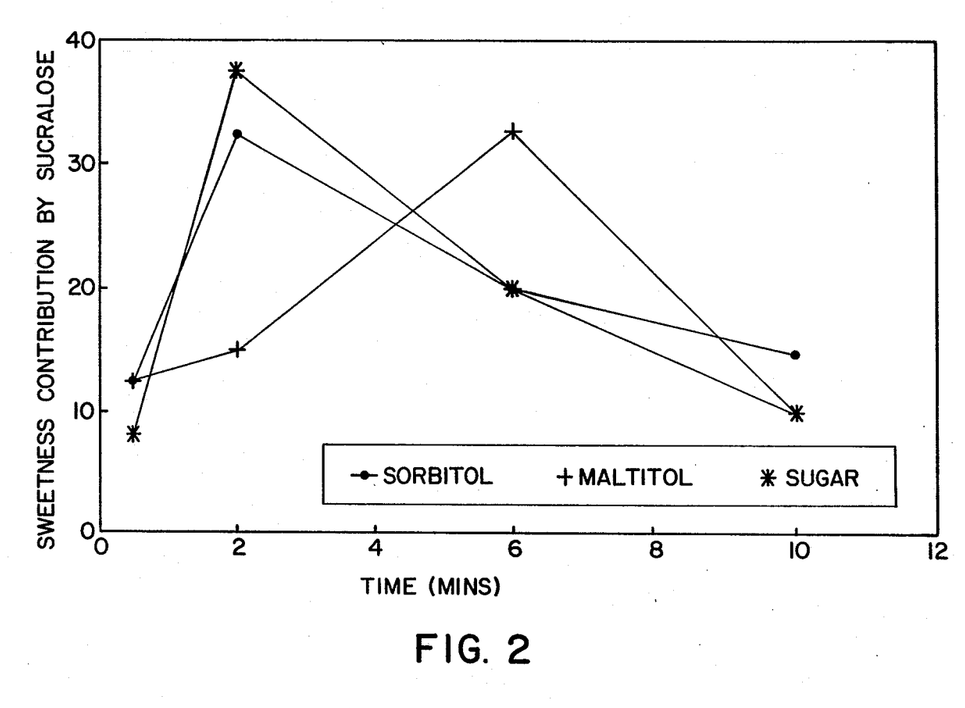
FIG. 2 depicts in graph format the sweetness intensity contribution versus time found for the intense sweetener Sucralose in chewing gum products containing various bulking agents.

In the manner set out for the above examples, the sweetness intensity contribution was determined versus time for the intense sweetener Sucralose in chewing gum products containing various bulking agents. FIG. 2 depicts the results of these experiments in graph format.

FIG. 2 shows that the chewing gum product containing Sucralose and maltitol as the bulking agent was significantly sweeter, especially after 6 minutes, than the chewing gum products which contained Sucralose and sugar as the bulking agent or Sucralose and sorbitol as the bulking agent.

Figure 3:
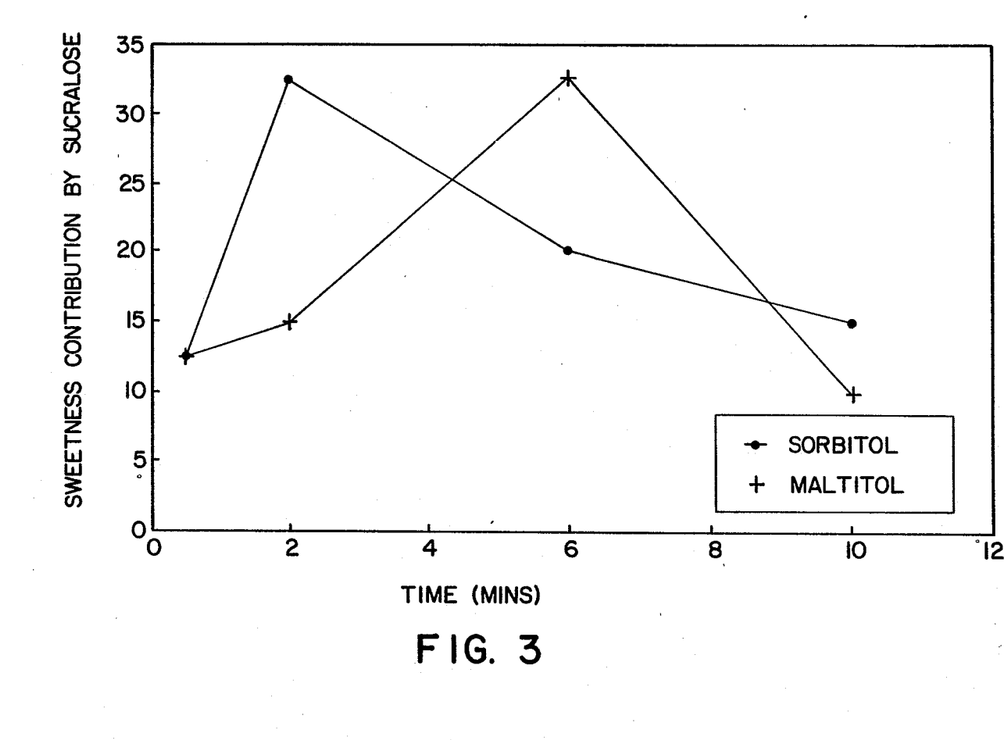
FIG. 3 depicts in graph format the sweetness intensity contribution versus time found for the intense sweetener Sucralose in two different chewing gum products containing sorbitol and maltitol as the bulking agent.

Also, in the manner set out for the above examples, the sweetness intensity contribution was determined versus time for the intense sweetener Sucralose in two different chewing gum products, containing sorbitol and maltitol as the bulking agent. FIG. 3 depicts the results of these experiments in graph format.

FIG. 3 shows that the chewing gum product containing Sucralose and maltitol as the bulking agent was significantly sweeter, especially after 6 minutes, than the chewing gum product which contained Sucralose and sorbitol as the bulking agent.

The invention being thus described, it will be obvious that the same may be varied in many ways. Such variations are not to be regarded as a departure from the spirit and scope of the invention and all such modifications are intended to be included within the scope of the following claims.

We claim:

1. A synergistic sweetening composition having a delayed and enhanced sweetness effect which comprises a chlorodeoxysugar derivative and a bulking agent comprising at least about 50% maltitol.

2. The composition of claim 1, wherein the chlorodeoxysugar derivative is selected from the group consisting of chlorodeoxysucrose derivatives and chlorodeoxygalactosucrose derivatives and mixtures thereof.

3. The composition of claim 2, wherein the chlorodeoxysugar derivative is 4,1',6'-trichloro-4,1',6'-trideoxygalactosucrose.

4. The composition of claim 1, wherein the bulking agent comprises maltitol present in an amount from about 75% to about 100%, by weight of the bulking agent.

5. The composition of claim 4, wherein the bulking agent comprises maltitol present in an amount from about 90% to about 100%, by weight of the bulking agent.

6. The composition of claim 1, wherein the chlorodeoxysugar derivative is present in an amount from about 0.001% to about 5%, by weight of the composition.

7. The composition of claim 6, wherein the chlorodeoxysugar derivative is present in an amount from about 0.01% to about 1%, by weight of the composition.

8. The composition of claim 7, wherein the chlorodeoxysugar derivative is present in an amount from about 0.02% to about 0.5%, by weight of the composition.

9. A synergistic sweetening composition for ingestible products which comprises an effective amount of a synergistic sweetening composition having a delayed and enhanced sweetness effect wherein the synergistic sweetening composition comprises a chlorodeoxysugar derivative and a bulking agent comprising at least about 50% maltitol.

10. A sweetened chewing gum composition having a synergistic sweetening composition which comprises a chewing gum base and an effective amount of a synergistic sweetening composition having a delayed and enhanced sweetness effect wherein the synergistic sweetening composition comprises a chlorodeoxysugar derivative and a bulking agent comprising at least about 50% maltitol.

11. The sweetened chewing gum composition of claim 10, wherein the chlorodeoxysugar derivative is selected from the group consisting of chlorodeoxysucrose derivatives and chlorodeoxygalactosucrose derivatives and mixtures thereof.

12. The sweetened chewing gum composition of claim 11, wherein the chlorodeoxysugar derivative is 4,1',6'-trichloro-4,1',6'-trideoxygalactosucrose.

13. The sweetened chewing gum composition of claim 10, wherein the bulking agent comprises maltitol present in an amount from about 75% to about 100%, by weight of the bulking agent.

14. The sweetened chewing gum composition of claim 13, wherein the bulking agent comprises maltitol present in an amount from about 90% to about 100%, by weight of the bulking agent.

15. The sweetened chewing gum composition of claim 10, wherein the chlorodeoxysugar derivative is present in an amount from about 0.001% to about 5%, by weight of the composition.

16. The sweetened chewing gum composition of claim 15, wherein the chlorodeoxysugar derivative is present in an amount from about 0.01% to about 1%, by weight of the composition.

17. The sweetened chewing gum composition of claim 16, wherein the chlorodeoxysugar derivative is present in an amount from about 0.02% to about 0.5%, by weight of the composition.

18. A sweetened chewing gum composition having a synergistic sweetening composition which comprises a chewing gum base and an effective amount of a synergistic sweetening composition having a delayed and enhanced sweetness effect wherein the synergistic sweetening composition comprises 4,1',6'-trichloro-4,1',6'-trideoxygalactosucrose and a bulking agent comprising at least about 50% maltitol.

19. A sweetened confectionery composition having a synergistic sweetening composition which comprises a confectionery base and an effective amount of a synergistic sweetening composition having a delayed and enhanced sweetness effect wherein the synergistic sweetening composition comprises a chlorodeoxysugar derivative and a bulking agent comprising at least about 50% maltitol.

20. The sweetened confectionery composition of claim 19, wherein the chlorodeoxysugar derivative is selected from the group consisting of chlorodeoxysucrose derivatives and chlorodeoxygalactosucrose derivatives and mixtures thereof.

21. The sweetened confectionery composition of claim 20, wherein the chlorodeoxysugar derivative is 4,1',6'-trichloro-4,1',6'-trideoxygalactosucrose.

22. The sweetened confectionery composition of claim 19, wherein the bulking agent comprises maltitol present in an amount from about 75% to about 100%, by weight of the bulking agent.

23. The sweetened confectionery composition of claim 22, wherein the bulking agent comprises maltitol present in an amount from about 90% to about 100%, by weight of the bulking agent.

24. The sweetened confectionery composition of claim 19, wherein the chlorodeoxysugar derivative is present in an amount from about 0.001% to about 5%, by weight of the composition.

25. The sweetened confectionery composition of claim 24, wherein the chlorodeoxysugar derivative is present in an amount from about 0.01% to about 1%, by weight of the composition.

26. The sweetened confectionery composition of claim 25, wherein the chlorodeoxysugar derivative is present in an amount from about 0.02% to about 0.5%, by weight of the composition.

27. A sweetened confectionery composition having a synergistic sweetening composition which comprises a confectionery base and an effective amount of a synergistic sweetening composition having a delayed and enhanced sweetness effect wherein the synergistic sweetening composition comprises 4,1',6'-trichloro-4',6'-trideoxygalactosucrose and a bulking agent comprising at least about 50% maltitol.

28. A method for preparing a synergistic sweetening composition which comprises admixing a chlorodeoxysugar derivative and a bulking agent comprising at least about 50% maltitol.

29. The method of claim 28, wherein the chlorodeoxysugar derivative is present in an amount from about 0.001% to about 5%, by weight of the synergistic sweetening composition.

30. The method of claim 29, wherein the chlorodeoxysugar derivative is present in an amount from about 0.01% to about 1%, by weight of the synergistic sweetening composition.

31. The method of claim 30, wherein the chlorodeoxysugar derivative is present in an amount from about 0.02% to about 0.5%, by weight of the synergistic sweetening composition.

32. The method of claim 28, wherein the chlorodeoxysugar derivative is selected from the group consisting of chlorodeoxysucrose derivatives and chlorodeoxygalactosucrose derivatives and mixtures thereof.

33. The method of claim 32, wherein the chlorodeoxysugar derivative is 4,1',6'-trichloro-4,1',6'-trideoxygalactosucrose.

34. The method of claim 28, wherein the bulking agent is present in an amount up to about 99.9%, by weight of the synergistic sweetening composition.

35. The method of claim 34, wherein the bulking agent is present in an amount from about 75% to about 99.9%, by weight of the synergistic sweetening composition.

36. The method of claim 35, wherein the bulking agent is present in an amount from about 90% to about 99%, by weight of the synergistic sweetening composition.

37. The method of claim 28, wherein the bulking agent comprises maltitol present in an amount from about 75% to about 100%, by weight of the bulking agent.

38. The method of claim 37, wherein the bulking agent comprises maltitol present in an amount from about 90% to about 100%, by weight of the bulking agent.

39. A method for sweetening ingestible compositions which comprises adding to the ingestible composition an effective amount of a synergistic sweetening composition having a delayed and enhanced sweetness effect wherein the synergistic sweetening composition comprises a chlorodeoxysugar derivative and a bulking agent comprising at least about 50% maltitol.

40. The method of claim 39, wherein the chlorodeoxysugar derivative is present in an amount from about 0.001% to about 5%, by weight of the synergistic sweetening composition.

41. The method of claim 40, wherein the chlorodeoxysugar derivative is present in an amount from about 0.01% to about 1%, by weight of the synergistic sweetening composition.

42. The method of claim 41, wherein the chlorodeoxysugar derivative is present in an amount from about 0.02% to about 0.5%, by weight of the synergistic sweetening composition.

43. The method of claim 39, wherein the chlorodeoxysugar derivative is selected from the group consisting of chlorodeoxysucrose derivatives and chlorodeoxygalactosucrose derivatives and mixtures thereof.

44. The method of claim 43, wherein the chlorodeoxysugar derivative is 4,1',6'-trichloro-4,1',6'-trideoxygalactosucrose.

45. The method of claim 39, wherein the bulking agent is present in an amount up to about 99.9%, by weight of the synergistic sweetening composition.

46. The method of claim 45, wherein the bulking agent is present in an amount from about 75% to about 99.9%, by weight of the synergistic sweetening composition.

47. The method of claim 46, wherein the bulking agent is present in an amount from about 90% to about 99%, by weight of the synergistic sweetening composition.

48. The method of claim 39, wherein the bulking agent comprises maltitol present in an amount from about 75% to about 100%, by weight of the bulking agent.

49. The method of claim 48, wherein the bulking agent comprises maltitol present in an amount from about 90% to about 100%, by weight of the bulking agent.

50. A method for providing a delayed and enhanced sweetness effect to an ingestible composition which comprises adding to the composition an effective amount of a synergistic sweetening composition having a delayed and enhanced sweetness effect wherein the synergistic sweetening composition comprises a chlorodeoxysugar derivative and a bulking agent comprising at least about 50% maltitol.

51. A sweetened confectionery product which comprises a confectionery bulking agent and an effective amount of a synergistic sweetening composition having a delayed and enhanced sweetness effect wherein the synergistic sweetening composition comprises a chlorodeoxysugar derivative and a bulking agent comprising at least about 50% maltitol.

52. A sweetened chewing gum product which comprises a gum base and an effective amount of a synergistic sweetening composition having a delayed and enhanced sweetness effect wherein the synergistic sweetening composition comprises a chlorodeoxysugar derivative and a bulking agent comprising at least about 50% maltitol.

* * * * *